March 15, 1932.  W. H. FLUKER  1,850,005
MOTOR VEHICLE LICENSE TAG
Filed April 23, 1931
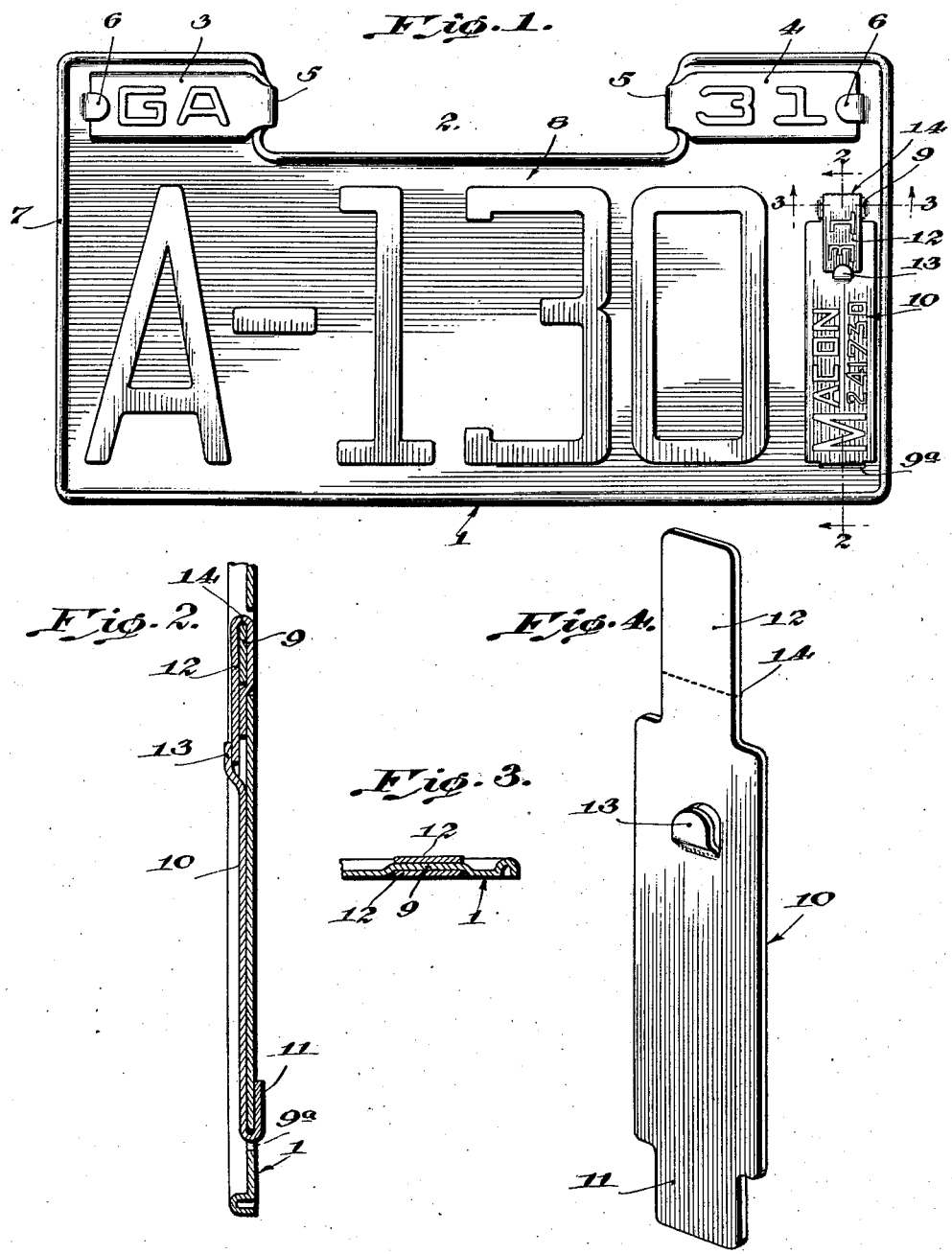
WITNESSES
INVENTOR
William H. Fluker,
BY
ATTORNEY Patented Mar. 15, 1932

1,850,005

UNITED STATES PATENT OFFICE

WILLIAM H. FLUKER, OF THOMSON, GEORGIA

MOTOR VEHICLE LICENSE TAG

Application filed April 23, 1931. Serial No. 532,365.

This invention relates to tags or license number plates especially designed for motor vehicles.

A primary object of the invention is to provide a plate of this character with an auxiliary tag or plate for use in any desired designation such as for city license, county license, business license or any other desired insignia.

Another object is to so construct and mount an auxiliary tag that it cannot be stolen, removed, or shifted from one automobile or object to another without disclosure.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 is a front elevation of an automobile license tag constructed in accordance with this invention;

Fig. 2 is a transverse section taken on the line 2—2 of Fig. 1;

Fig. 3 is a detail longitudinal section taken on the line 3—3 of Fig. 1; and

Fig. 4 is a perspective view of the auxiliary tag employed.

In the embodiment illustrated a motor vehicle tag 1 is shown having a cut out portion 2 in its upper edge intermediate the ends thereof and from the ends of which cut out portions are extended indicia carrying tongues 3 and 4. These tongues as shown are struck out from the same sheet of metal as the body portion of the tag and are connected therewith by transversely scored necks 5 which are bendable to position the body portion of the tongue over the front face of the tag and which are connected thereto by means of outstruck lips or lugs 6 under which the free ends of the tongues are designed to be inserted as shown clearly in Fig. 1. A reinforcing bead 7 surrounds the circumferential edge of the tag 1 and this tag bears on its front face the usual vehicle license number 8. The plate 1 is provided at any suitable point, preferably at one edge thereof, with an outstruck strap 9 and at a point spaced a suitable distance therefrom with a slot or opening 9a designed to receive and hold the auxiliary tag 10.

This auxiliary tag 10 may be of any desired shape and of any suitable metal and it of course may be located in any desired position on a suitable support being here shown mounted on plate 1, preferably adjacent to the state license number. While this tag 10 may be made in any desired shape, it is substantially rectangular in form being provided with suitably located tongues 11 and 12 the latter being longer than the formed for a purpose presently to be described.

An offset lug or lip 13 is struck out preferably from the body of the plate 10 near the end carrying the tongue 12 and which is designed to receive thereunder the free end of this tongue when it is threaded through the strap 9 as shown clearly in Fig. 2.

This tongue 12 at its point of bending is scored as shown at 14 to weaken it at this point so that should the tongue be bent back to its original position for the purpose of removing the auxiliary tag it will break at the scored point and thus avoid all possibility of changing it to another vehicle.

The license plate 1 is provided with longitudinally extending bolt receiving slots at the upper corners thereof, which are positioned to underlie the sealing tongues or flaps 3 and 4 when they are bent into operative position shown in Fig. 1 and which cover the bolt ends and nuts when so positioned, and prevent accidental detachment of the nuts. These flaps are designed to carry indicia, one preferably carrying the state abbreviation, and the other the year. When these flaps are bent into operative position their free ends are inserted under the tabs 6 formed in longitudinal alinement with the bolt receiving slots near the end edges of the plate and operate to securely hold the flaps in closed sealed position. These flaps have their necks 5 so scored or otherwise constructed that they will stand but one bending so that care should be taken not to experiment with them without carefully first reading the directions for attaching the tags to the vehicle. The tabs 6 are first bent straight out at right angles to the plate before the plate is bolted to the car and after the flaps or tongues 3 and 4 have been bent down these tabs are pressed firmly down over the ends of the flaps and securely hold the plate in operative position.

In the use of this tag the license number plate 1 having been provided with a struck out strap 9 and a slot or opening 9a the tongue 12 of the auxiliary tag 10 is threaded through the strap 9 and its free end which constitutes the sealing member is bent down over the face of the plate 1 and inserted under the lip 13 as shown clearly in Figs. 1 and 2. The lower end carrying the tongue 11 is then connected with the plate 1 by inserting the tongue 11 through the slot or opening 9a and bending said tongue up against the rear face of the plate 1, thereby fastening it in operative position.

From the above description it will be seen that when the auxiliary tongue has been applied as above described it will be impossible to remove it without breaking off the tongue 12 at the scored point 14 and thereby disclosing the fact that it has been removed and avoiding all possibility of attaching it to a similar or other license plate.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. The combination with a carrier plate or the like and an auxiliary indicia carrying plate, said carrier plate having an opening and an outstruck strap arranged in spaced relation, the auxiliary plate having bendable tongues, one adapted for insertion through the plate opening and the other for threading through the strap, a lip carried by the auxiliary plate to receive the free end of the tongue threaded through the strap of the carrier plate whereby the two plates are secured in operative relation, and means to insure breakage of the strap threaded tongue should any attempt be made to separate the plates.

2. In combination with a carrier plate and an auxiliary indicia carrying plate, said carrier plate having an opening and an outstruck strap arranged in spaced relation, the auxiliary plate having bendable tongues, one adapted for insertion through the plate opening and the other for threading through the strap, and a lip carried by the auxiliary plate to receive the free end of the tongue threaded through the strap.

WILLIAM H. FLUKER.